United States Patent
Takano (10) Patent No.: US 6,934,556 B2
(45) Date of Patent: Aug. 23, 2005

(54) TRANSMISSION POWER CORRECTING METHOD, MOBILE COMMUNICATIONS SYSTEM AND MOBILE STATION

(75) Inventor: Michiaki Takano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 365 days.

(21) Appl. No.: 10/216,771

(22) Filed: Aug. 13, 2002

(65) Prior Publication Data

US 2003/0148780 A1 Aug. 7, 2003

(30) Foreign Application Priority Data

Feb. 6, 2002 (JP) ........................................ 2002-029585

(51) Int. Cl.[7] ................................................ H04B 7/00
(52) U.S. Cl. ...................... 455/522; 455/69; 455/67.11; 370/337; 370/329
(58) Field of Search ....................... 455/522, 69, 67.11; 370/337, 329, 347, 428, 392, 442

(56) References Cited

U.S. PATENT DOCUMENTS

| | | | |
|---|---|---|---|
| 5,982,813 A | | 11/1999 | Dutta et al. |
| 5,991,329 A | | 11/1999 | Lomp et al. |
| 6,484,287 B1 | * | 11/2002 | Hagele et al. ............... 714/807 |
| 6,795,412 B1 | * | 9/2004 | Lee ............................ 370/329 |
| 2001/0040880 A1 | * | 11/2001 | Chen et al. ................. 370/337 |
| 2003/0036403 A1 | * | 2/2003 | Shiu et al. .................. 455/522 |
| 2003/0186653 A1 | * | 10/2003 | Mohebbi et al. ......... 455/67.11 |
| 2003/0207696 A1 | * | 11/2003 | Willenegger et al. ....... 455/522 |
| 2004/0082353 A1 | * | 4/2004 | Kekki .......................... 455/522 |

FOREIGN PATENT DOCUMENTS

| | | |
|---|---|---|
| EP | 0 887 948 | 12/1998 |
| EP | 0 940 930 | 9/1999 |
| EP | 1 130 797 | 9/2001 |
| JP | 2000-278207 | 10/2000 |

OTHER PUBLICATIONS

S. W. Kim, et al., IEEE Transactions on Communications, vol. 48, No. 1, pp. 162–168, XP–002258771, "Combined Rate and Adaptation in DS/CDMA Communications Over Nakagami Fading Channels", Jan. 2000.
L. Xu, et al., IEEE Global Telecommunications Conference, vol. 1 of 6, pp. 627–631, XP–001090330, "Performance Analysis of Adaptive Rate and Power Control for Data Service in DS–CDMA Systems", Nov. 25, 2001.
"3rd Generation Partnership Project; Technical Specification Group Radio Access Network; High Speed Downlink Packet Access: Physical Layer Aspects (Release 5)", 3GPP TR 25.858 V1.0.0, Dec. 2001, pp. 10–21.
"3rd Generation Partnership Project; Technical Specification Group Radio Access Networks; UE Radio Transmission and Reception (FDD) (Release 1999)", 3GPP TS 25.101 V3.8.0, Sep. 2001, pp. 1–64.
"3rd Generation Partnership Project; Technical Specification Group Radio Access Network; Physical Layer Aspects of Utra High Speed Downlink Packet Access (Release 4)", 3GPP TR 25.848 V4.0.0, Mar. 2001, pp. 1–89.

* cited by examiner

*Primary Examiner*—Nick Corsaro
*Assistant Examiner*—Tan Trinh
(74) *Attorney, Agent, or Firm*—Oblon, Spivak, McClelland, Maier & Neustadt, P.C.

(57) ABSTRACT

A mobile station in a mobile communications system directs a base station to raise a transmission power using identification data, when a reception quality measured by the mobile station is lower than a desired reception quality. The mobile station also directs the base station to lower the transmission power using identification data, when the reception quality measured by the mobile station is higher than the desired reception quality.

7 Claims, 10 Drawing Sheets

| TFRC(x, y) | POWER OFFSET | IDENTIFICATION DATA |
|---|---|---|
| TFRC(1, y) | 12dB | 0 |
| TFRC(1, y) | 11dB | 1 |
| TFRC(1, y) | 10dB | 2 |
| TFRC(1, y) | 9dB | 3 |
| TFRC(1, y) | 8dB | 4 |
| TFRC(1, y) | 7dB | 5 |
| TFRC(1, y) | 6dB | 6 |
| TFRC(1, y) | 5dB | 7 |
| TFRC(1, y) | 4dB | 8 |
| TFRC(1, y) | 3dB | 9 |
| TFRC(1, y) | 2dB | 10 |
| TFRC(1, y) | 1dB | 11 |
| TFRC(1, y) | 0dB | 12 |
| TFRC(2, y) | 2dB | 13 |
| TFRC(2, y) | 1dB | 14 |
| TFRC(2, y) | 0dB | 15 |
| TFRC(3, y) | 2dB | 16 |
| TFRC(3, y) | 1dB | 17 |
| TFRC(3, y) | 0dB | 18 |
| TFRC(4, y) | 2dB | 19 |
| TFRC(4, y) | 1dB | 20 |
| TFRC(4, y) | 0dB | 21 |
| TFRC(5, y) | 2dB | 22 |
| TFRC(5, y) | 1dB | 23 |
| TFRC(5, y) | 0dB | 24 |
| TFRC(6, y) | 2dB | 25 |
| TFRC(6, y) | 1dB | 26 |
| TFRC(6, y) | 0dB | 27 |
| TFRC(6, y) | -1dB | 28 |
| TFRC(6, y) | -2dB | 29 |
| TFRC(6, y) | -3dB | 30 |
| TFRC(6, y) | -4dB | 31 |

| POWER OFFSET | ANTILOGARITHM |
|---|---|
| -4dB | 0.40 |
| -3dB | 0.50 |
| -2dB | 0.63 |
| -1dB | 0.79 |
| 0dB | 1 |
| 1dB | 1.26 |
| 2dB | 1.58 |
| 3dB | 2.00 |
| 4dB | 2.51 |
| 5dB | 3.16 |
| 6dB | 3.98 |
| 7dB | 5.01 |
| 8dB | 6.31 |
| 9dB | 7.94 |
| 10dB | 10 |
| 11dB | 12.59 |

FIG.10

| TFRC(x) | MODULATION | TBS SIZE | NO. OF CODES IN MULTICODE |
|---|---|---|---|
| TFRC(1) | QPSK | 1200 | 5 |
| TFRC(2) | QPSK | 2400 | 5 |
| TFRC(3) | QPSK | 3600 | 5 |
| TFRC(4) | 16QAM | 4800 | 5 |
| TFRC(5) | 16QAM | 6000 | 5 |
| TFRC(6) | 16QAM | 7200 | 5 |

FIG.11

| TFRC(x) | POWER OFFSET | IDENTIFICATION DATA |
|---|---|---|
| TFRC(1) | 12dB | 0 |
| TFRC(1) | 11dB | 1 |
| TFRC(1) | 10dB | 2 |
| TFRC(1) | 9dB | 3 |
| TFRC(1) | 8dB | 4 |
| TFRC(1) | 7dB | 5 |
| TFRC(1) | 6dB | 6 |
| TFRC(1) | 5dB | 7 |
| TFRC(1) | 4dB | 8 |
| TFRC(1) | 3dB | 9 |
| TFRC(1) | 2dB | 10 |
| TFRC(1) | 1dB | 11 |
| TFRC(1) | 0dB | 12 |
| TFRC(2) | 2dB | 13 |
| TFRC(2) | 1dB | 14 |
| TFRC(2) | 0dB | 15 |
| TFRC(3) | 2dB | 16 |
| TFRC(3) | 1dB | 17 |
| TFRC(3) | 0dB | 18 |
| TFRC(4) | 2dB | 19 |
| TFRC(4) | 1dB | 20 |
| TFRC(4) | 0dB | 21 |
| TFRC(5) | 2dB | 22 |
| TFRC(5) | 1dB | 23 |
| TFRC(5) | 0dB | 24 |
| TFRC(6) | 2dB | 25 |
| TFRC(6) | 1dB | 26 |
| TFRC(6) | 0dB | 27 |
| NA | NA | 28 |
| NA | NA | 29 |
| NA | NA | 30 |
| NA | NA | 31 |

# TRANSMISSION POWER CORRECTING METHOD, MOBILE COMMUNICATIONS SYSTEM AND MOBILE STATION

BACKGROUND OF THE INVENTION

1. Field of the Invention

The present invention generally relates to transmission power correcting methods, mobile communications system, and mobile stations, and, more particularly, to a transmission power correcting method, a mobile communications system and a mobile station in which a transmission power of a source of transmission is corrected, based on a reception quality measured at a destination of transmission.

2. Description of the Related Art

For downstream transmission in a mobile communications system, i.e. data transmission from a base station to a mobile station, a technology known as high speed downlink packet access (HSDPA) is used for high-speed, large-volume downloading. A discussion on HSPDA underway in 3rd Generation Partnership Project (3GPP) is directed to changing of a modulation scheme and a Turbo coding rate in accordance with the quality of reception at a mobile station. In changing a modulation scheme and a Turbo coding rate, it is necessary for a base station to notify a mobile station of the modulation scheme and the Turbo coding rate to be used. Particularly, in adaptive modulation coding (AMC) in which a modulation scheme and a Turbo coding rate are adaptively changed, transmission (signaling) of information related to the modulation coding scheme from the base station to the mobile station occurs frequently. 3GPP Technical Report (TR) 25.858V1.0.0 "8 Associated Signaling" (hereinafter, referred to as reference 1) gives a description of a signaling procedure related to this signaling. Information related to the modulation coding scheme includes transport-format and resource combination (TFRC).

Figure 10:
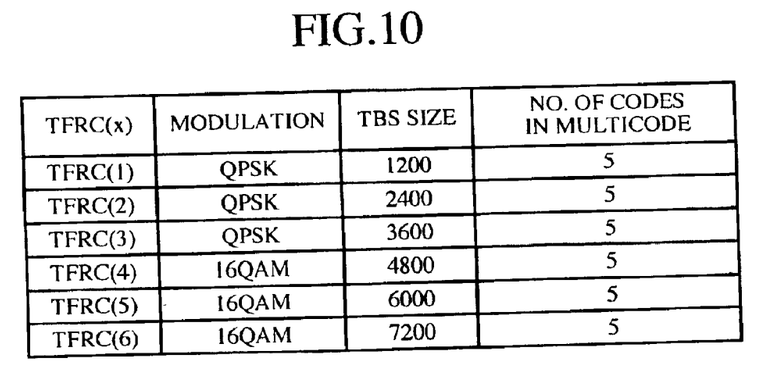
FIG. 10 is a list of TFRCs given in reference 1.

FIG. 10 shows an example of TFRC list given in reference 1. The list is provided in a portion of reference 1 where uplink signaling is described. The list lists substantially the same information related to the modulation coding scheme transmitted from the base station to the mobile station in downlink signaling. The list lists combinations of a modulation scheme, a transport block set (TBS) size and the number of codes. The modulation scheme may be one of two digital modulation schemes including quaternary phase shift keying and (QPSK) and 16 quadrature amplitude modulation (QAM). A TBS size indicates the data size of a transport block (TrBlk) included in a frame multiplied by the number of blocks. That is, the TBS size indicates the data size of a frame. A TBS size is a parameter related to Turbo coding and is one type of information related to modulation coding scheme. It is assumed here that a multicode scheme, in which a plurality of channelization codes (spreading codes) are assigned to a mobile station, is used. The list lists the number of codes included in a multicode (in the illustration the number of codes is 5).

For example, TFRC1 includes parameters such that modulation scheme=QPSK, TBS size=1200 bit and number of codes=5. In the case of TFRC6, modulation scheme=16 QAM, TBS size=7200 bit and number of codes=5. Assuming that spreading factor (SF)=16 and one frame=2 ms, the volume of data per frame is 4800 bits when modulation scheme=QPSK, 9600 bits when modulation scheme=16 QAM. The Turbo coding rate is ¼ for TFRC(1), ½ for TFRC(2), ¾ for TFRC(3), ½ for TFRC(4), ⅝ for TFRC(5) and ¾ for TFRC(6). The information given above is not immediately available from the table of FIG. 10, though.

In transmitting the information (TFRC, according to reference 1) related to the modulation coding scheme from the base station to the mobile station, instead of transmitting the information as it is, identification data having a smaller data volume is transmitted. Identification data corresponds to transport-format and resource related information (TFRI) of reference 1. The data volume of TFRI is defined in reference 1 as follows.

Channelization code set: 7 bits
Modulation scheme: 1 bit
Transport block set size: 6 bits A channelization code set indicates a combination of a plurality of channelization codes assigned to a mobile station according to a multicode scheme. FIG. 10, listing TFRCs, would not be complete without listing channelization code sets instead of only the number of codes. FIG. 10, however, serves the purpose since it corresponds to a special case where the number of codes is fixed to 5. Therefore, only the number of codes is given.

Traffic between the base station and the mobile station is reduced by employing an information transmission scheme in which the information related to the modulation coding scheme is converted into the identification data.

The mobile station of the mobile communications system measures the quality of reception. By feeding back the result of measurement to the base station, the transmission power of the base station is corrected to an appropriate level. More specifically, uplink signaling from the mobile station is used to inform the base station of a power offset value, based on the quality of reception measured by the mobile station. In accordance with the information obtained through signaling, the base station corrects the transmission power.

Figure 11:
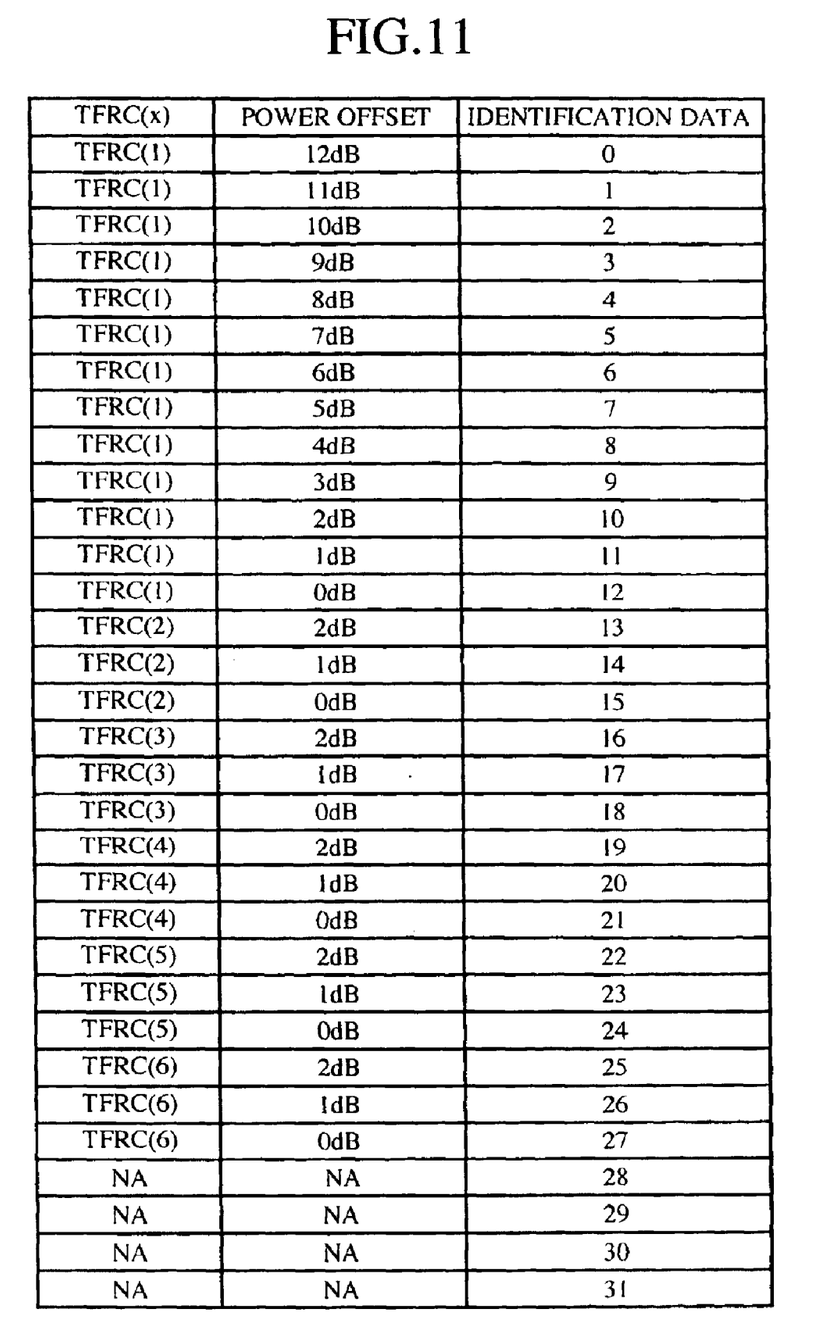
FIG. 11 is a table listing power offset values given in reference 1.

FIG. 11 shows a table of reference 1 listing power offset values. The table of FIG. 11 lists a plurality of power offset values for each TFRC listed in FIG. 10. An identification code is associated with each set of a TFRC and the power offset value. Power offset=0 dB is used as a default value in each set of a TFRC and a power offset value. Referring to FIG. 11, power offset values of 1 dB and 2 dB are prescribed for TFRC(2)–TFRC(6) other than the default power offset value of 0 dB. For TFRC(1), in addition to 0 dB, the power offset values up to 12 dB in steps of 1 dB are provided. By transmitting a desired power offset shown in FIG. 11 to the base station, based on the quality of reception measured by the mobile station, the power of transmission from the base station is subject to fine control so that the throughput of the entire system is improved.

However, in a system configuration as described in reference 1, where the mobile station only notifies the base station of an increase in the transmission power, the transmission power requested may exceed the total power, i.e. power rating, of the base station. Another disadvantage with the related-art system configuration is that, performing only an increase in the transmission power of the base station may induce an adverse effect of intra-cell interference or inter-cell interference.

SUMMARY OF THE INVENTION

Accordingly, a general object of the present invention is to provide a transmission power correcting method, a mobile communications system and a mobile station in which the aforementioned disadvantages of the related art are eliminated.

Another and more specific object is to provide a transmission power correcting method, a mobile communications system and a mobile station in which it is possible to improve the throughput of the entire system while controlling intra-cell interference or inter-cell interference.

The aforementioned objects can be achieved by a transmission power correcting method or a mobile communication system, in which the source of transmission is directed to raise the transmission power when the reception quality measured at the destination of transmission is lower than a desired reception quality and to lower the transmission power when the reception quality measured at the destination of transmission is higher than the desired reception quality.

According to the transmission power correcting method or the mobile communications system of the present invention, the transmission power may be reduced instead of raised as such a requirement arises. Since the transmission power is variable according to a requirement, power control capable of preventing the transmission power from exceeding a power rating of a base station is possible so that the total throughput is improved. Since the total power in a base station is reduced, intra-cell interference and inter-cell interference are controlled. The same advantages of improved throughput and controlling of intra-cell interference and inter-cell interference are also available from a mobile station according to the invention.

By allowing the mobile station to direct the base station to lower a transmission power, when a modulation scheme providing the lowest reception quality is being used and when a reception quality measured is higher than a desired reception quality, the transmission power is reduced only when the modulation scheme with the lowest reception quality fails to deal with such a situation. Accordingly, the construction of a system is simplified.

By reducing the number of spreading codes used instead of raising the transmission power for each code, an increase in the total power is controlled.

By configuring the base station, receiving a request to reduce the number of spreading codes and an instruction to raise the transmission power, to correct the number of spreading codes and the transmission power so that the total power does not exceed a power rating, a more practical system is provided.

BRIEF DESCRIPTION OF THE DRAWINGS

Other objects and further features of the present invention will be apparent from the following detailed description when read in conjunction with the accompanying drawings, in which.

DETAILED DESCRIPTION OF THE PREFERRED EMBODIMENTS

Figure 1:
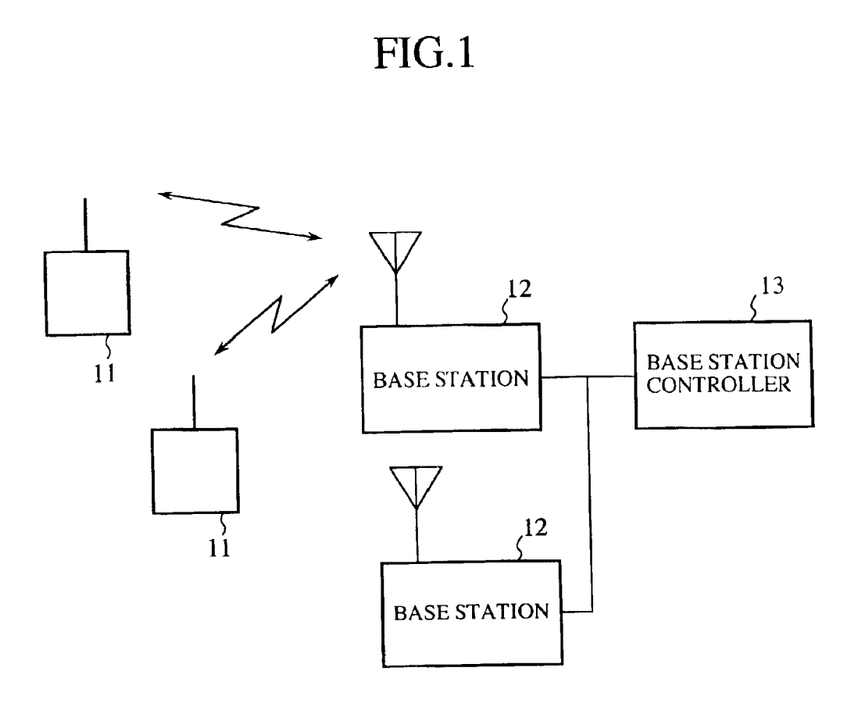
FIG. 1 shows a mobile communications system according to a first embodiment of the present invention.

FIG. 1 shows a construction of a mobile communications system according to a first embodiment. The communications system comprises a mobile station 11, a base station 12 and a base station controller 13. The mobile station 11 is capable of communicating with the base station 12 as it is being moved by the user carrying the mobile station 11. The base station 12 is equipment installed at a predefined location and is capable of simultaneous wireless communication with a plurality of mobile stations 11. The base station 12 is connected to a base station controller 13 hosting the base station 12 via a cable for transmission between the base station 12 and the base station controller 13. The base station 12 is responsible for connecting the mobile station 11 to a wire communication circuit. The base station controller 13 is connected to a plurality of base stations 12 and responsible for various types of control related to the base station 12. The base station controller 13 is also responsible for connecting the mobile station 11 to the public circuit network via the base station 12.

In the mobile communications system shown in FIG. 1, a signal originating from the mobile station 11 is transmitted to a destination of communication via the base station 12, the base station controller 13 and the public circuit network (not shown). A signal originating from the destination of communication is transmitted to the mobile station 11 via the public circuit network, the base station controller 13 and the base station 12.

Figure 2:
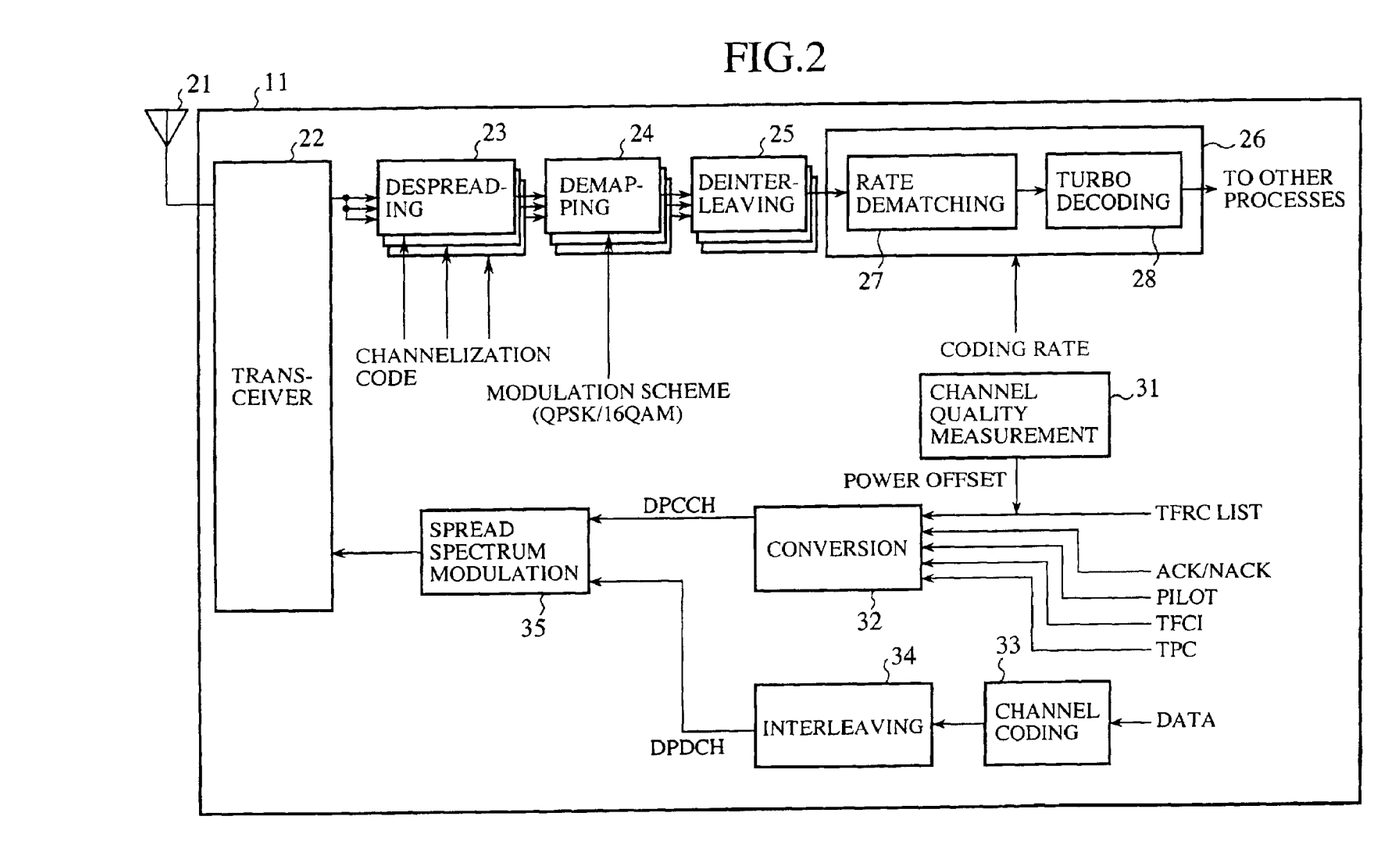
FIG. 2 is a block diagram showing a configuration of a mobile station of FIG. 1.

FIG. 2 shows a construction of the mobile station of FIG. 1. The mobile station comprises an antenna 21, a transceiver 22, a despreading unit 23, a demapping unit 24, a deinterleaving unit 25, a channel decoding unit 26, a channel quality measuring unit 31, a converting unit 32, a channel coding unit 33, an interleaving unit 34 and a spread spectrum modulating unit 35. The channel decoding unit 26 is provided with a rate de-matching unit 27 and a Turbo decoding unit 28.

A description will now be given of the operation of reception in the mobile station.

A radio signal arriving from the base station is received by the antenna 21, the frequency thereof being converted by the transceiver 22 from a radio frequency to a base band frequency, which is then input to the despreading unit 23. The despreading unit 23 subjects the signal output from the transceiver 22 to a despreading process using a channelization code requested by the base station. The despread signal is output to the demapping unit 24. The demapping unit 24 subjects the signal output from the despreading unit 23 to conversion from an IQ symbol to bits, using a modulation scheme (QPSK/16QAM) requested by the base station. When QPSK is used, two bits are output. When 16 QAM is used, four bits are output. The signal output from the demapping unit 24 is subject to a deinterleaving process by the deinterleaving unit 25. The signal from the deinterleaving unit 25 is output to the channel decoding unit 26. The rate dematching unit 27 of the channel decoding unit 26 subjects the signal output from the deinterleaving unit 25 to a rate dematching process. The signal from the rate dematching unit 27 is subject to a Turbo decoding process by the Turbo decoding unit 28. The signal output from the rate dematching unit 26 is output to another processing block in the mobile station.

A description will now be given of the operation of transmission in the mobile station.

The channel quality measuring unit 31 is supplied with the signal from the reception system described above so as to measure the quality of reception of the signal arriving from the base station channel by channel. The channel quality measuring unit 31 determines a power offset to be provided to the base station, based on the result of measurement. The conversion unit 32 converts TFRC, ACK/NACK, PILOT, TFCI and TPC that include a power offset value output from the channel quality measuring unit 31 into respective identification data so as to output the identification data to the spread spectrum modulating unit 35 via a dedicated physical control channel (DPCCH). Information data is subject to the Turbo coding process and the rate matching process in the channel coding unit 33. The data output from the channel coding unit 33 is subject to the interleaving process by the interleaving unit 34. The signal from the interleaving unit 34 is output to the spread spectrum modulating unit 35 via a dedicated physical data channel (DPDCH). The DPCCH data and the DPDCH data are subject to a predetermined spreading process by the spread spectrum modulating unit 35 for digital modulation according to a predetermined modulation scheme. The signal output from the spread spectrum modulating unit 35 is subject by the transceiver 22 to frequency conversion whereby a baseband frequency is converted into a radio frequency. The signal at the radio frequency is transmitted from the antenna 21.

ACK/NACK indicates an acknowledge/negative acknowledge signal indicating to the base station whether downlink reception data is properly transmitted. PILOT indicates a PILOT signal providing a reference for timing/phase to be learned by the base station. TFCI indicates a transport format combination indicator signal indicating a combination of transport formats. TPC indicates a transmit power control signal provided for downlink transmission power control.

Figure 3:
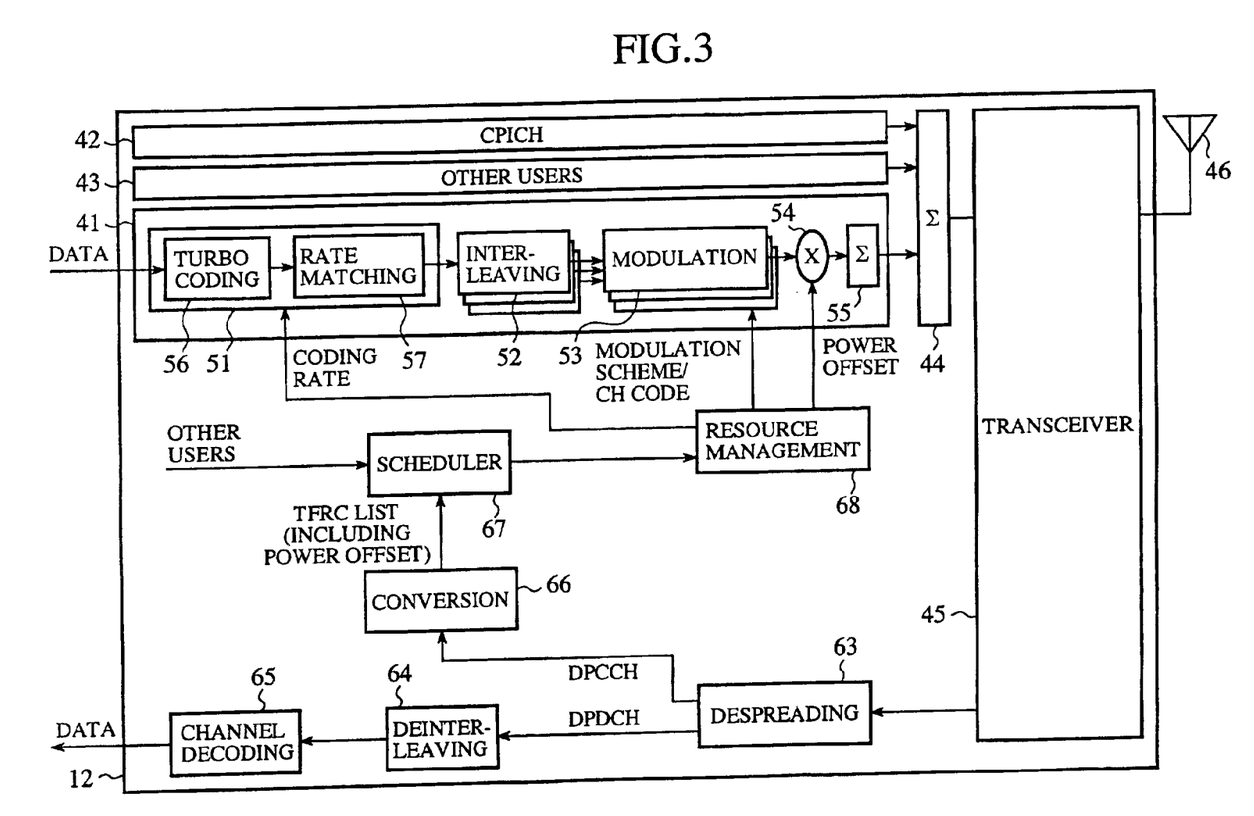
FIG. 3 is a block diagram showing a configuration of a base station of FIG. 1.

FIG. 3 shows a construction of the base station shown in FIG. 1. The base station comprises a downlink packet channel (HS-DSCH) transmission process unit 41, a common pilot channel (CPICH) transmission process unit 42, a transmission process unit 43 for another channel, a multiplexing unit 44, a transceiver 45, an antenna 46, a despreading unit 63, a deinterleaving unit 64, a channel decoding unit 65, a converting unit 66, a scheduler 67 and a resource management unit 68. The downlink packet channel transmission process unit 41 is provided with a channel coding unit 51, an interleaving unit 52, a modulating unit 53, a multiplier unit 54 and a multiplexing unit 55. The channel coding unit 51 is provided with a Turbo coding unit 56 and a rate matching unit 57.

A description will now be given of the operation of reception in the base station.

The radio signal arriving from the mobile station is received by the antenna 46 and subject by the transceiver 45 to frequency conversion whereby a radio frequency is converted into a baseband signal. The signal output from the transceiver 45 is subject by the despreading unit 63 to a despreading process using a predetermined spreading code. The DPDCH data included in the data subjected to the despreading process is output to the deinterleaving unit 64 and the DPCCH data is output to the converting unit 66. The DPDCH data is subject to a deinterleaving process by the deinterleaving unit 64 and to a rate matching process and a Turbo decoding process by the channel decoding unit 65.

The data subjected to the Turbo decoding process is transmitted to the base station controller hosting the base station. The DPCCH data includes identification data produced in a conversion step in the mobile station. The DPCCH data is converted into original TFRC, ACK/NACK, PILOT, TFCI, TPC. The TFRC, which include a power offset value, is output by the scheduler 67 to the resource management unit 68 under predetermined timing control. The resource management unit 68 manages the TFRCs for each of the plurality of mobile stations. In the resource management unit 68, the TFRC stored in the resource management unit 68 is replaced by the TFRC output from the scheduler 67. The resource management unit 68 informs the channel coding unit 51 of a coding rate, informs the modulating unit 53 of a channelization code set and a coding scheme, and informs the multiplier 54 of a power offset value.

A description will now be given of the operation of transmission from the base station.

The signal transmitted from the base station controller hosting the base station is subject to a Turbo coding process in the Turbo coding unit 56 and to a rate matching process in the rate matching unit 57. The channel coding unit 51 comprising the Turbo coding unit 56 and the rate matching unit 57 controls a combined coding rate of Turbo coding and rate matching to match the coding rate requested by the resource management unit 68. The signal output from the channel coding unit 51 is subject to an interleaving process by the interleaving unit 52. The signal subjected to the interleaving process is output to the modulating unit 53. The modulating unit 53 performs a digital modulation process (conversion from bits into IQ symbols), using a modulation scheme requested by the resource management unit 68. The modulating unit 53 performs a spreading process using the channelization code requested by the resource management unit 68. The signal for each channel output from the modulating unit 53 is multiplied in the multiplier 54 by a gain corresponding to the power offset value. The signal output from the multiplier 54 is multiplexed by the multiplexer 55. The signal output from the multiplexer 55 is multiplexed with the CPICH data and the signals of the other channels by the multiplexer 44. The signal output from the multiplexer 44 is subject by the transceiver 45 to frequency conversion whereby a baseband frequency is converted into a radio frequency for radio transmission from the antenna 46 to the mobile station.

Figure 4:
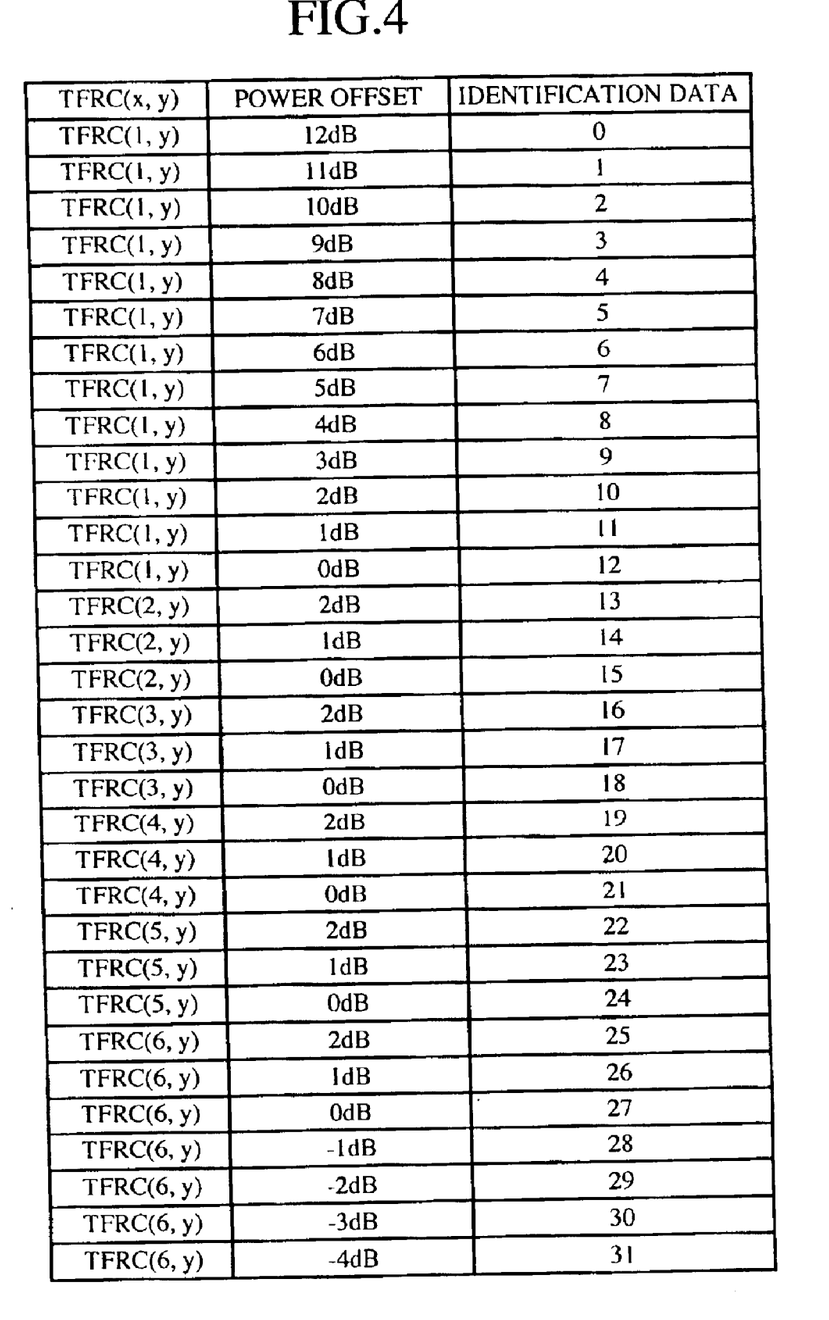
FIG. 4 shows a table listing power offset values provided by the mobile station to the base station.

FIG. 4 shows a table listing power offset values reported from the mobile station to the base station. In addition to the power offset values, the table of FIG. 4 lists TFRC (x,y) corresponding to information other than the power offset and indicating a TFRC type. The table lists identification data in association with each combination of TFRC(x,y) and power offset value. x of TFRC(x,y) in FIG. 4 is the same as x of TRC(x) in FIG. 10, where x=1–6. y indicates the number of codes in a multicode, where y=1–15. For each set of TFRCs with the same number x, where y may take any value, the power offset=0 dB is used as a default. For TFRC(2,y) –TFRC(5,y), power offset values of 1 dB and 2 dB are used in addition to the default power offset value of 0 dB. For TFRC(1), in addition to 0 dB, the power offset values up to 12 dB in steps of 1 dB are used.

For TFRC(6,y), a set of power offset values −1 dB, −2 dB, −3 dB and −4 dB are provided in addition to the power offset values of 0 dB, 1 dB and 2 dB. By providing TFRC(6,y) with negative power offset values, it is possible to reduce the power of transmission from the base station when the mobile station is located in the neighborhood of the base station. Accordingly, the level of interference with other channels belonging to the same cell or interference with other cells is reduced.

Figure 5A:
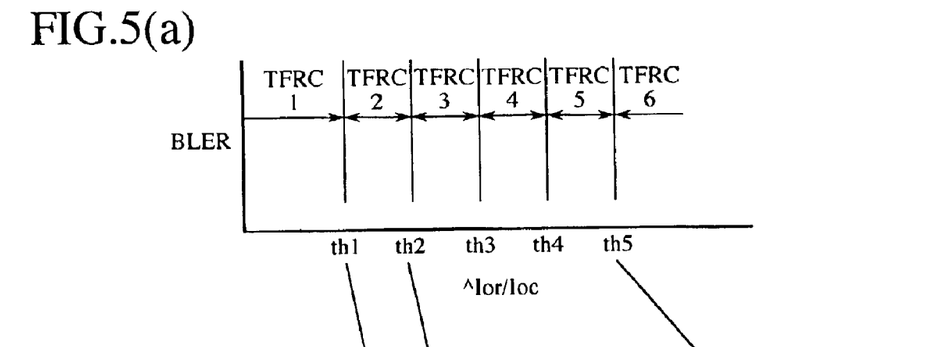
FIG. 5(a) shows a BLER-^Ior/Ioc characteristic.
Figure 5B:
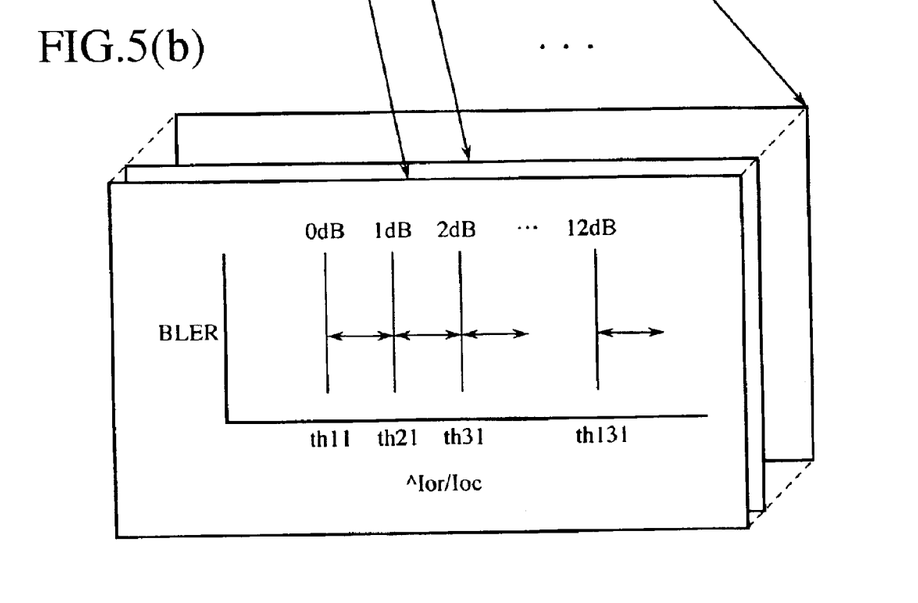
FIG. 5(b) shows a BLER-^Ior/Ioc characteristic with a power offset value used as a parameter.

FIG. 5(a) shows a BLER characteristic with respect to ^Ior/Ioc, and FIG. 5(b) shows a BLER characteristic with respect to ^Ior/Ioc using power offset values as parameters. A description of FIG. 5(a) will be given. ^Ior and Ioc of ^Ior/Ioc are defined in 3 GPP TS25.101V3.8.0 as follows. ^Ior: Spectral density of downlink received power measured by a mobile station antenna connector. Ioc: Spectral density of bandwidth-limited white noise power measured by a mobile station antenna connector BLER indicates a block error rate. The characteristic provided by different TFRCs is described in 3GPP TR25.848V4.0.0. In the descending order of levels of BLER characteristic, TFRCs are arranged such that TFRC(1,y), TFRC(2,y), TFRC(3,y), TFRC(4,y), TFRC(5,y), TFRC(6,y), where y may take any value. A TFRC with a good BLER characteristic means a TFRC requiring a low level of ^Ior/Ioc for a given BLER. The channel quality measuring unit 31 of the mobile station 11 measures the characteristic described above. TFRC used in downlink transmission from the base station to the mobile station is determined by level comparison between the measured characteristic and threshold values th1, th2, th3, th4 and th5. The threshold values are arranged such that th1, th2, th3, th4 and th5 in the ascending order of levels. TFRC(1,y) provides the best BLER characteristic since it requires a minimum lelvel of ^Ior/Ioc. Accordingly, TFRC(1,y) is assigned to a mobile station located at a cell edge (cell boundary). TFRC(2,y)-TFRC(5,y) are assigned to the other mobile stations located successively closer to the base station. The most inward mobile station, i.e. the mobile station closest to the base station is assigned TRC(6,y).

A description will now be given of FIG. 5(b). The power offset values are arranged such that 0 dB, 1 dB, 2 dB, . . . , 12 dB in the descending order of excellence of BLER characteristic. The power offset value to be provided from the base station to the mobile station is determined by level comparison with threshold values th1, th2, th31, . . . , th131.

Figure 6:
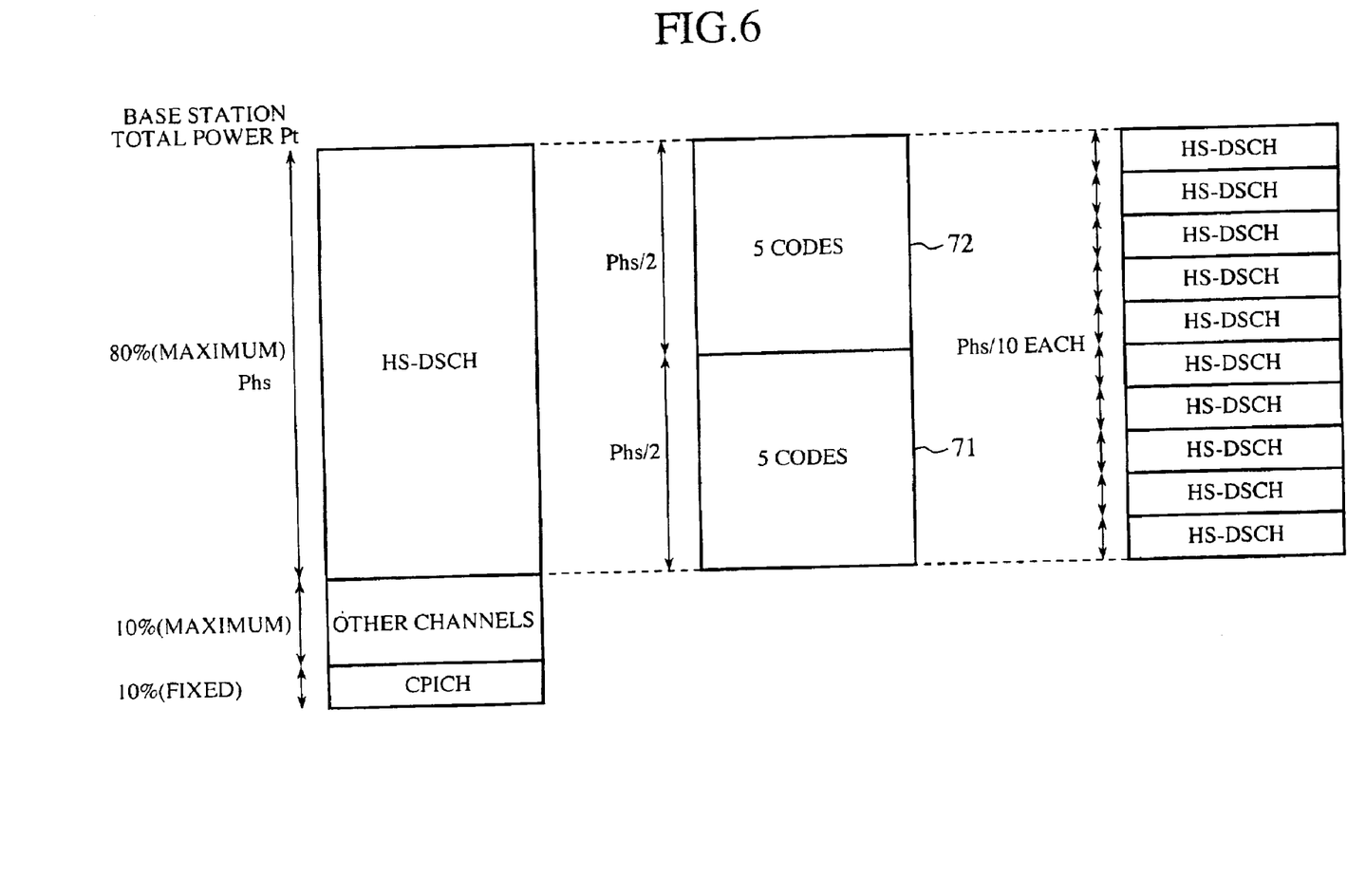
FIG. 6 shows default transmission power distribution in a base station.

FIG. 6 shows default transmission power distribution in a base station. It is assumed here that the number of codes=10 in a downlink packet channel (HS-DSCH). Of the power rating Pt(100%) of the base station, a maximum of 80% is assigned to the HS-DSCH, a maximum of 10% is assigned to the common pilot channel (CPICH), and 10% is permanently assigned to the other channels. The other channels include an individual physical channel for individual users, and a common control channel. The total HS-DSCH power $P_{hs}$ is assigned to two users (two mobile stations). A code set 71 including 5 codes is assigned to user 1 and a code set 72 including 5 codes are assigned to user 2. A distributed power of $P_{hs}/10$ resulting from division-by-10 of the total HS-DSCH power $P_{hs}$ is assigned to a code of HS-DSCH.

Figure 7:
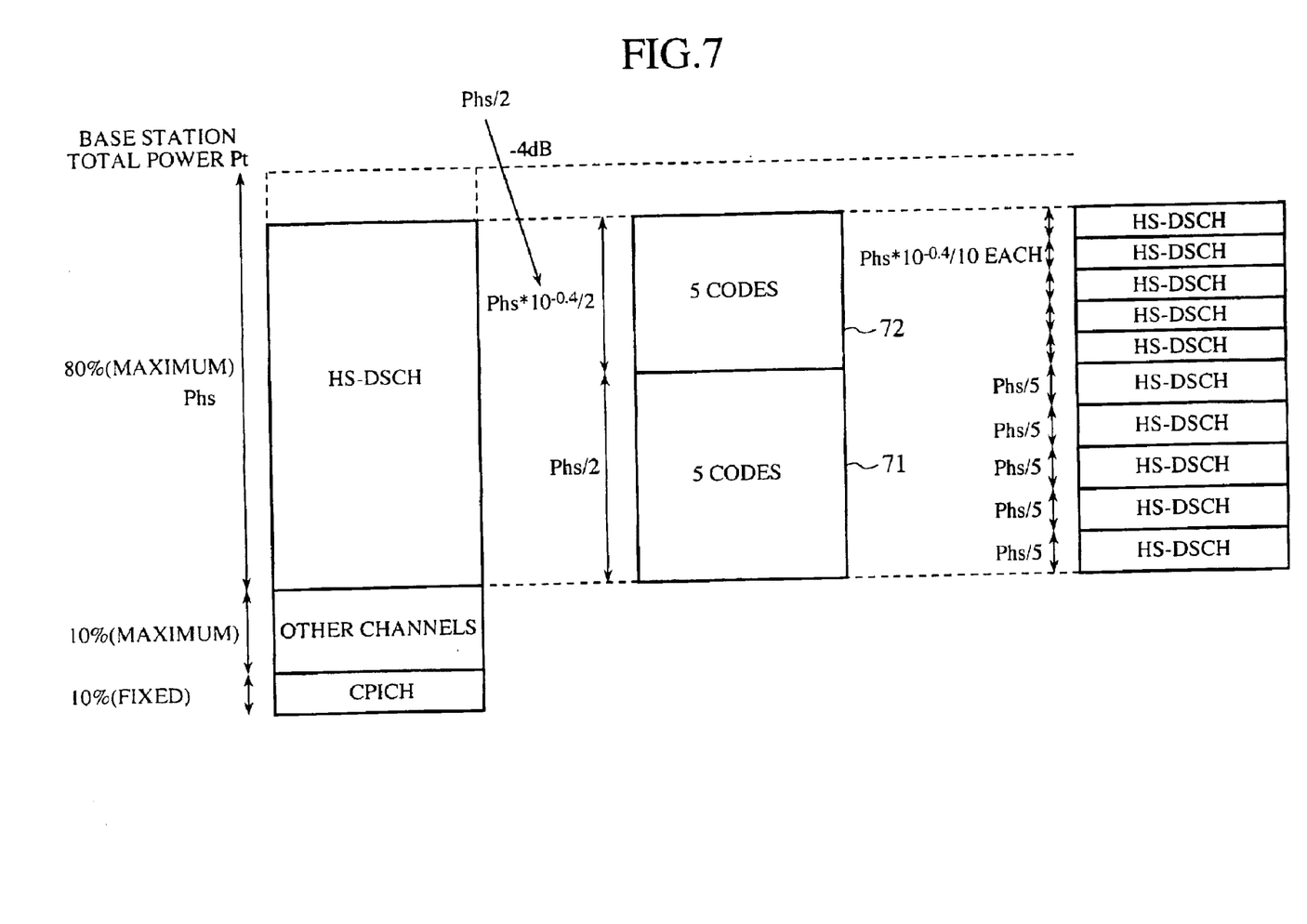
FIG. 7 shows transmission power distribution introduced in a base station when available power is reduced.

FIG. 7 shows transmission power distribution introduced when the available power is decreased. As in FIG. 6, of the total power Pt(100%) of the base station, a maximum of 80% is assigned to the HS-DSCH, 10% is permanently assigned to the common pilot channel (CPICH), and a maximum of 10% is assigned to the other channels. The total HS-DSCH power $P_{hs}$ is assigned to two users, five codes are assigned to user 1 and five codes are assigned to user 2. Referring to FIG. 4, assuming that user 1 is assigned TFRC(1,y) and power offset value=0 dB, and user 2 is assigned TFRC(6,y) and power offset value=−4 dB, the power assigned to code set 71 for user 1 remains $P_{hs}/2$. The power assigned to the code set 72 for user 2 is dropped by 4 dB from $P_{hs}/2$ to $P_{hs}*10-0.4/2$. Accordingly, the HS-DSCH power is reduced.

Since the portion occupied by the HS-DSCH power in the base station power is relatively large, the above arrangement makes it possible to reduce intra-cell interference and inter-cell interference. Orthogonal codes are used in each of the channels in a given cell. Accordingly, intracell interference is theoretically 0 under a single-path environment. In an actual cellular environment, intra-cell interference caused by geographical reflection and diffraction presents a serious problem. By reducing the HS-DSCH power according to the embodiment described above, adverse effects from interference with other users and other channels are successfully controlled.

Second Embodiment

Figure 8:
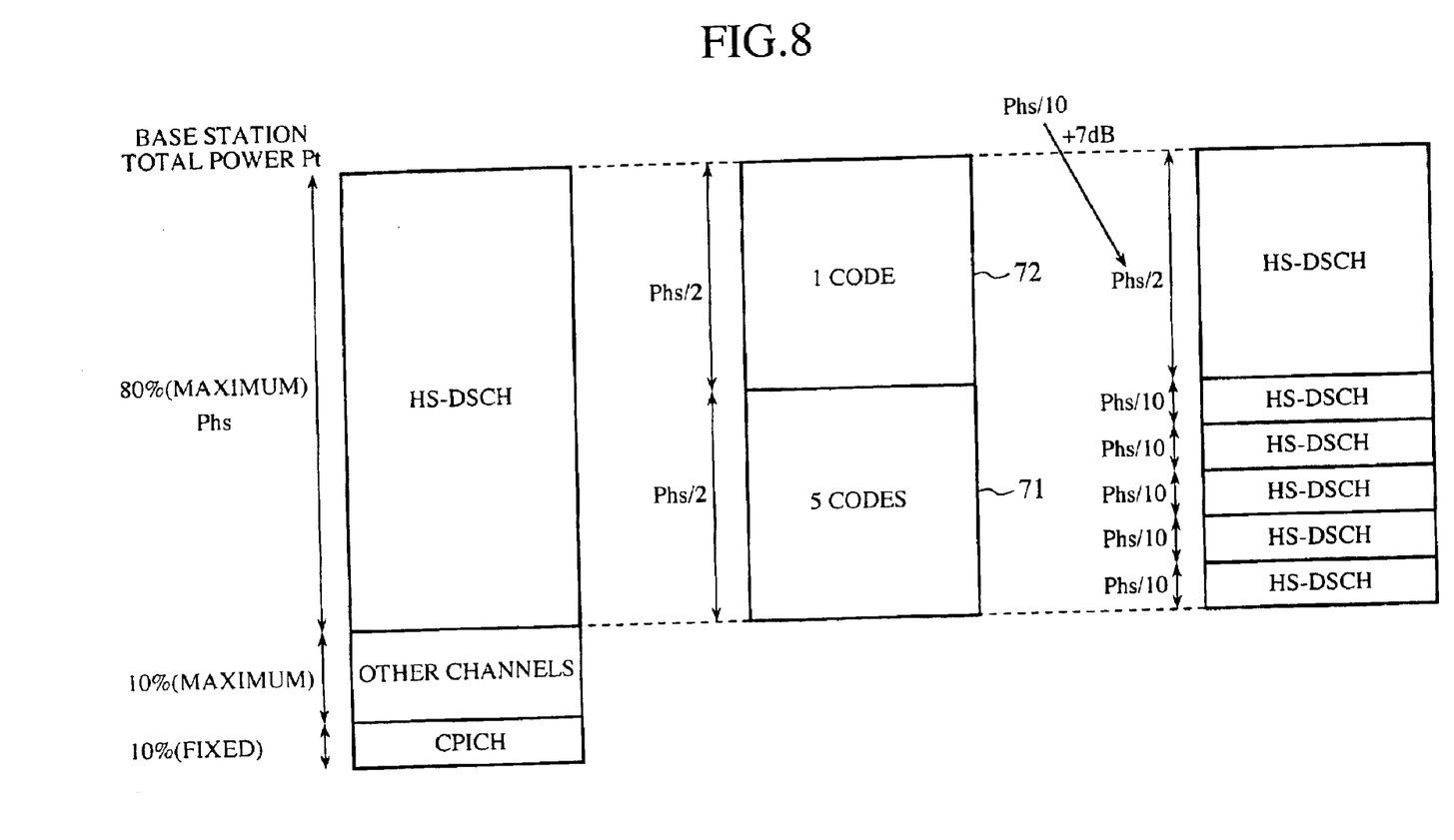
FIG. 8 shows transmission power distribution in a base station according to a second embodiment of the present invention.

FIG. 8 shows distribution of base station power according to a second embodiment of the present invention. Of the total power Pt(100%) of the base station, a maximum of 80% is assigned to the total HS-DSCH power, 10% is permanently assigned to the common pilot channel (CPICH) and a maximum of 10% is assigned to the other channels. The default power distribution is the same as that shown in FIG. 6. According to the second embodiment, the power distribution as shown in FIG. 8 introduced. Referring to FIG. 8, the total HS-DSCH power $P_{hs}$ is assigned to two users. The code set 71 comprising five codes is assigned to user 1 and the code set 72 comprising one code is assigned to user 2. Referring to FIG. 4, assuming that user 1 is assigned TFRC(1,y) and power offset value=0 dB and user 2 is assigned TFRC(1,y) and power offset value=7 dB, the power assigned to the code set 71 for user 1 is $P_{hs}/2$ and the power assigned to the code set 72 for user 2 is $P_{hs}/2$. While the power per code for user 1 is $P_{hs}/10$, the same level as shown in FIG. 6, the power per code for user 2 is $P_{hs}/2$, an substantial increase from the power level of FIG. 6.

Varying the number of codes is especially useful when the reception quality measured by the mobile station is lower than a desired reception quality. By allowing the mobile station to direct the base station to reduce the number of spreading codes used and to raise the transmission power, it is ensured that the quality of reception in the mobile station is improved. That is, under a given condition of total power, he number of codes in a multicode is changed so that the per-code power distribution is changed. The other aspects of the configuration and operation are the same as those of the first embodiment so that the description thereof is omitted.

Figure 9:
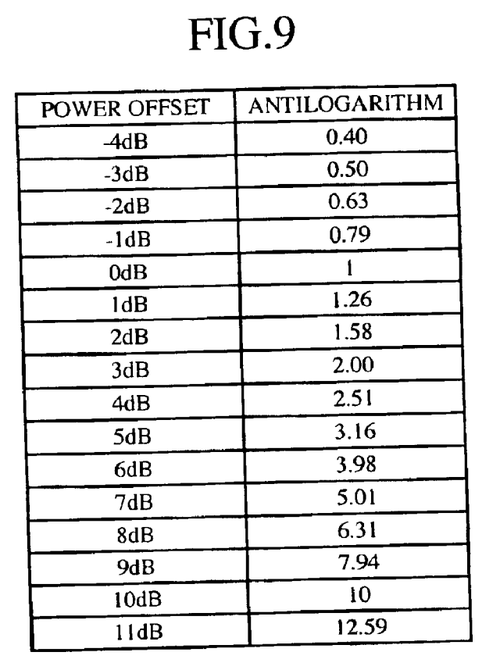
FIG. 9 is a table listing correspondence between power offset values and antilogarithms.

FIG. 9 shows a table listing power offset values in association with antilogarithms. As described above, in order to distribute the power in a given condition of total power, a requirement is that a sum of antilogarithms of power offset values for each channel, does not exceed the number of codes provided in the base station (for example, 10 or 15). As long as this requirement is met, the power can be distributed as desired. An example for a case of 10 codes is shown in FIG. 8. In a case of 15 codes, user 1 may be assigned the number of codes of 1 and a 10 dB offset, and user 2 may be assigned the number of codes of 5 and a 0 dB offset.

As described above, the mobile station is allowed to direct the base station to reduce the number of spreading codes used in addition to directing the base station to raise the transmission power, when the reception quality measured by the mobile station is lower than a desired reception quality. Conversely, the mobile station may be allowed to direct the base station to increase the number of spreading codes used and to lower the transmission power, when the reception quality measured in the mobile station is higher than the desired reception quality. The total HS-DSCH power may be assigned a portion other than "a maximum of 80%". The invention is also useful in a configuration in which the power ratio with respect to CPICH is not constant.

The present invention is not limited to the above-described embodiments, and variations and modifications may be made without departing from the scope of the present invention.

What is claimed is:

1. A method of transmission power control, comprising the steps of:

identifying, by a mobile station, a transport block set size to a base station, said transport block set size being based on a quality of a signal transmitted from the base station and received by the mobile station;

identifying, by a mobile station, a transmission power correction value to the base station, wherein said transmission power correction value corresponds to the transport block set size and said transmission power correction value is a negative value when the transport block set size is a predetermined maximum size; and correcting a transmission power from the base station to the mobile station based on the identified transmission power correction value.

2. The transmission power control method according to claim 1, wherein said step of identifying a transmission power correction value comprises:

identifying the negative value only when the transport block set size to be identified is the predetermined maximum size.

3. The transmission power control method according to claim 2, wherein said step of identifying a transmission power correction value comprises identifying the transmission power correction value as identification data.

4. The transmission power control method according to claim 1, wherein said step of identifying a transmission power correction value comprises identifying the transmission power correction value as identification data.

5. A mobile station, comprising:

an identification device configured to identify a transport block set size to a base station, said transport block set size being based on a quality of a signal transmitted from the base station and received by the mobile station; and an identification device configured to identify a transmission power correction value to the base station, wherein said transmission power correction value corresponds to the transport block set size and said transmission power correction value is a negative value when the transport block set size is a predetermined maximum size.

6. A base station, comprising:

a correction device configured to correct a transmission power from the base station to a mobile station based on a transmission power correction value identified by the mobile, wherein said transmission power correction value corresponds to a transport block set size, said transmission power correction value is a negative value when the transport block set size is a predetermined maximum size, and said transport block set size is based on a quality of a signal transmitted from the base station and received by the mobile station.

7. A mobile communication system, comprising: a mobile station, said mobile station including an identification device configured to identify a transport block set size to a base station, said transport block set size being based on a quality of a signal transmitted from the base station and received by the mobile station; and an identification device configured to identify a transmission power correction value from the mobile station to the base station, wherein said transmission power correction value corresponds to the transport block set size and said transmission power correction value is a negative value when the transport block set size is a predetermined maximum size; and said base station, said base station including a correction device configured to correct a transmission power from the base station to the mobile station based on the identified transmission power correction value.

* * * * *